United States Patent [19]

Wergin et al.

[11] Patent Number: 4,875,651
[45] Date of Patent: Oct. 24, 1989

[54] TRANSDUCER MOUNTING DEVICE

[76] Inventors: Dennis D. Wergin; Antone L. Wergin, both of 3955 W. Arby Ave., Las Vegas, Nev. 89118

[21] Appl. No.: 280,668

[22] Filed: Dec. 6, 1988

[51] Int. Cl.⁴ ............................................. E04G 3/00
[52] U.S. Cl. ................................. 248/286; 248/231.7; 248/903
[58] Field of Search ............... 248/286, 284, 285, 291, 248/298, 311.3, 231.7, 540, 541, 214, 122, 903, 296, 287; 5/503; 128/DIG. 6

[56] References Cited

U.S. PATENT DOCUMENTS

| | | | |
|---|---|---|---|
| 369,971 | 9/1887 | Stillman | 248/286 X |
| 1,266,367 | 5/1918 | Wilson | 248/284 X |
| 1,867,757 | 7/1932 | Honjowetz | 248/286 X |
| 2,686,030 | 8/1954 | Johnjon | 248/286 X |
| 3,026,079 | 3/1962 | Stack | 248/125 |
| 3,126,191 | 3/1964 | Holden | 248/286 |
| 3,148,851 | 9/1964 | Condon | 248/540 X |
| 3,298,648 | 1/1967 | Sepanski | 248/103 |
| 3,709,372 | 1/1973 | Alexander | 211/74 |
| 3,835,486 | 9/1974 | Benoit et al. | 5/317 R |
| 4,013,253 | 3/1977 | Perrault et al. | 248/903 X |
| 4,231,611 | 11/1980 | Bird | 248/540 X |
| 4,547,092 | 10/1985 | Vetter et al. | 248/296 X |
| 4,796,846 | 1/1989 | Meier | 248/286 |

Primary Examiner—Ramon O. Ramirez
Attorney, Agent, or Firm—Quirk, Tratos & Roethel

[57] ABSTRACT

A transducer mounting device maintains a transducer at a constant level in relationship to the patient lying on an operating table regardless of any raising, lowering, tilting or rotating of the operating table that may occur during an operation. The transducer mounting device is securely fastened to the frame of the operating table and comprises a bar that includes a horizontal arm portion extending along the side of the table and a vertical arm portion extending upward from the end of the horizontal arm portion to provide a mounting surface for the transducer at the level of the patient's heart. The horizontal arm portion is laterally offset from the frame of the operating table to allow clearance space during the initial orientation of the horizontal and vertical arm portions.

15 Claims, 3 Drawing Sheets

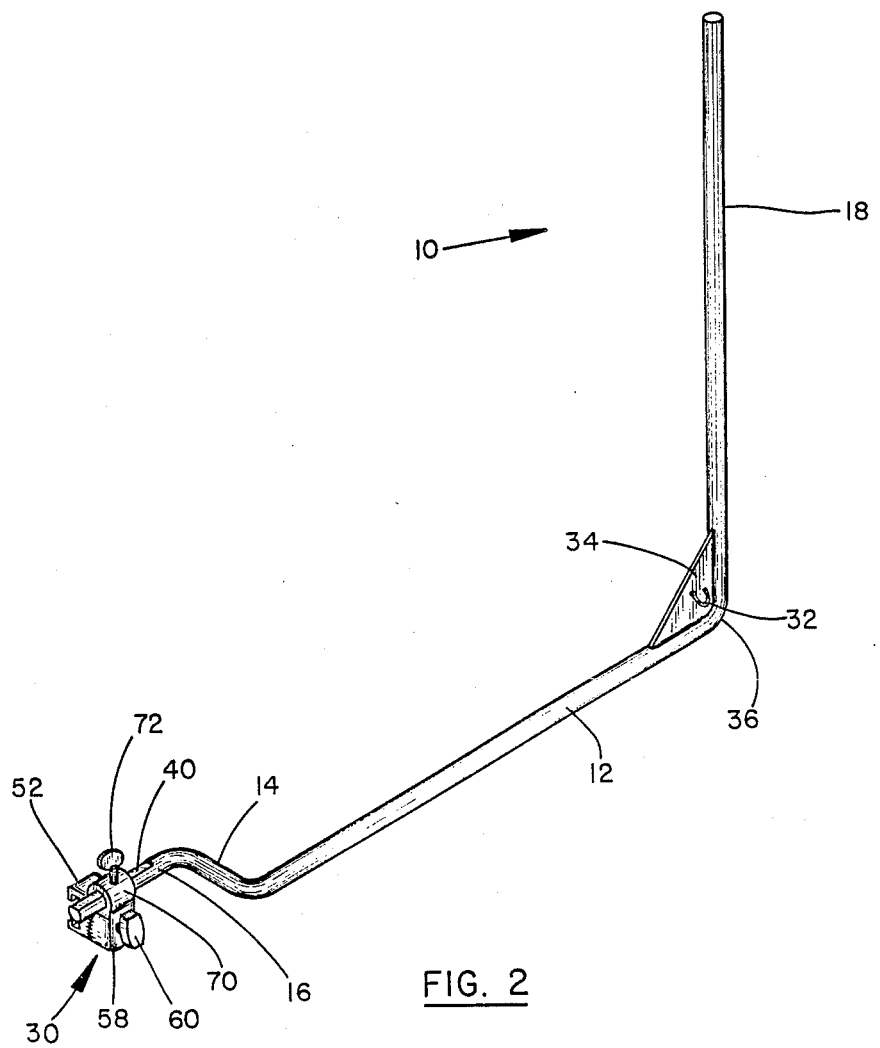
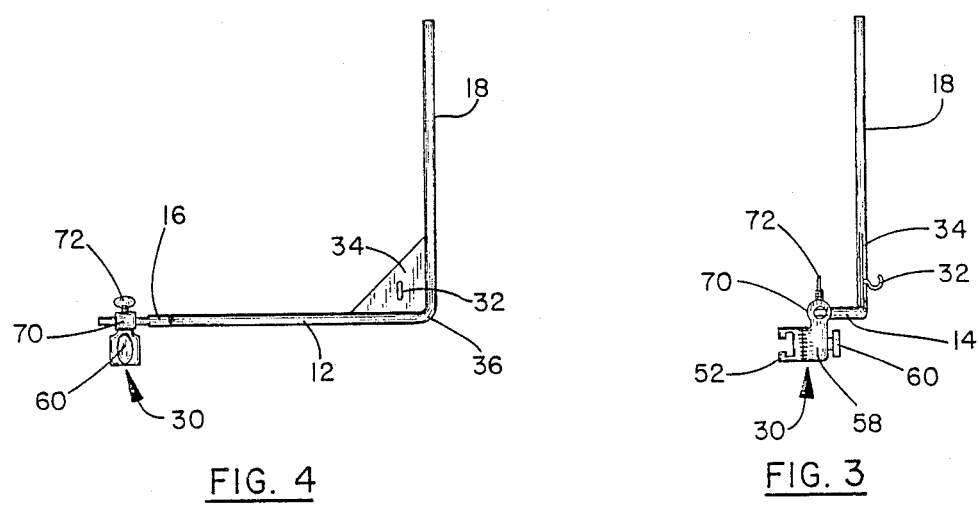

TRANSDUCER MOUNTING DEVICE

BACKGROUND OF THE INVENTION

The invention relates to a transducer mounting device, and more particularly to a transducer mounting device on a hospital operating table.

During hospital operating procedures, and especially during major surgery, it is necessary to position transducers at the level of the patient's heart. One or more transducers are used to monitor the patient's blood pressure. It is typical to monitor the patient's condition by taking readings at the left radial artery, the pulmonary artery and by monitoring the central venus pressure. In order for the readings from the transducers to be most accurate, each transducer should be maintained at the level of the patient's heart. A transducer support holds the one or more transducers that are being used during the operation. Thus the transducer support must be oriented with reference to the patient to achieve the desired relationship between each transducer and the level of the patient's heart. The usual practice to achieve this relationship is to mount the transducer support on a stationary intravenous pole which in turn is supported on a wheeled stand along side the operating table.

During operating procedures, it is often necessary to raise, lower, rotate or tilt the operating table. Whenever one of these movements is effected, it then becomes necessary to reposition the transducer support on the intravenous pole to maintain the transducer at the exact level of the patient's heart.

The present invention provides a transducer mounting device that is attached directly to the hospital operating table. Any movement of the operating table, whether it is raised, lowered, rotated or tilted, will not affect the positioning of the transducer at the level of the patient's heart. The transducer mounting device has an extension finger that slides into an adjustable bracket on the frame of the operating table. The bracket holds the transducer mounting device securely in place during use, yet provides for easy removal of the mounting device when a transducer is not needed.

It is an object of the present invention to provide a transducer mounting device that maintains the transducer at the level of the patient's heart at all times during the operating procedure.

It is a feature of the present invention to have the transducer mounting device attached directly to the hospital operating table by means of an adjustable bracket so that the transducer can be initially positioned at the level of the patient's heart.

It is an advantage of the present invention that, when the operating table is raised, lowered, rotated or tilted during the operating procedure, the transducer will always remain at the level of the patient's heart.

SUMMARY OF THE INVENTION

The transducer mounting device of the present invention comprises a round steel bar that is attached to an adjustable bracket on the frame of a hospital operating table. The bar extends horizontally along the side of the operating table to a point remote from the end of the table. At that location, a vertical extension of the bar is provided which serves as a mounting means for holding the transducer. Peripheral equipment used in connection with the transducer is hung from a hook positioned at the junction of the horizontal arm portion of the bar and the vertical arm portion of the bar.

BRIEF DESCRIPTION OF THE DRAWING

FIG. 2 shows a perspective view of the transducer mounting device of the present invention.

FIG. 3 shows an end view of the transducer mounting device of the present invention.

FIG. 4 shows a side view of the transducer mounting device of the present invention.

DETAILED DESCRIPTION OF THE PREFERRED EMBODIMENTS

Figure 1:
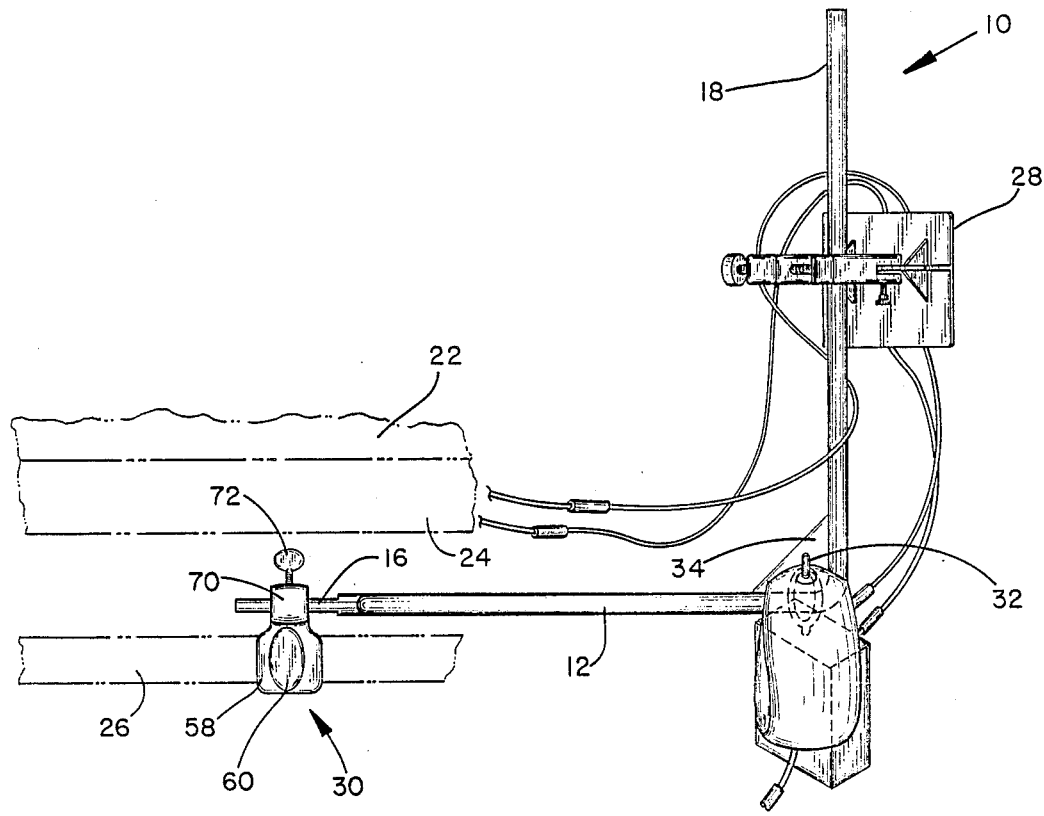
FIG. 1 shows the transducer mounting device of the present invention attached to a hospital operating table.

With reference to FIG. 1, the transducer mounting device of the present invention is shown generally at 10. Shown in phantom and in section is the hospital operating table 20. The operating table comprises a mattress 22, a mattress support element 24 and an operating table frame 26. The table frame 26 lies under the mattress support element 24 and provides a convenient location to mount the bracket 30.

The transducer mounting device 10 comprises a round steel bar having a horizontal arm portion 12 and a vertical arm portion 18. The horizontal arm portion has an extension finger 16 that connects with the bracket 30 to securely hold the transducer mounting device 10 to the table frame 26. A transducer support 28 is mounted to the vertical arm portion 18 and the transducer's peripheral equipment hangs from a hook 32 which is mounted on a triangular reinforcing member 34. The transducer support 28 is a conventional device that holds up to four transducers so that the patient's blood pressure can be monitored at up to four locations on the patient's body. A typical transducer support 28 is sold by the Spectramed Company.

FIG. 2 shows in detail the transducer mounting device 10. In the preferred embodiment as shown in FIG. 2, the transducer mounting device 10 comprises a round, hot-rolled stock steel bar, approximately 0.5 inches in diameter. The vertical arm portion 18 of the bar is approximately 14 inches long and is integral with the horizontal arm portion 12 of the bar, also approximately 14 inches long. The bend 36 between the vertical arm portion 18 and the horizontal arm portion 12 is approximately 90°. In the crook of the bend 36, a triangular reinforcing member 34 is welded along its sides to the vertical arm portion 18 and the horizontal arm portion 12. The length of each welded side of the triangular reinforcing member 34 is approximately one inch. Instead of welding, other conventional attachment methods could be used to join the member 34 to the bar.

The triangular reinforcing member 34 comprises a flat steel plate and includes a hook means 32 welded to what will be, in use, the outside (away from the operating table side) of the triangular reinforcing member 34. The hook means 32 is a metal, upwardly opening hook suitable for suspending therefrom part of the peripheral equipment associated with the transducer. The hook means 32 can be attached to the member 34 by other conventional methods other than welding and means other than the hook means 32 can be used to support the transducer peripheral equipment.

At one end of the horizontal arm portion 12 (opposite from the end at which the vertical arm portion 18 is provided), a horizontal extension finger 16 is provided. The extension finger 16 is preferably three inches long and is offset from the axis of the horizontal arm portion 12 by a distance of approximately two inches by use of an integral horizontal offset member 14. The extension finger 16 is a generally coplanar with the offset member. In the preferred embodiment, the extension finger 16, the offset member 14, the horizontal arm portion 12 and the vertical arm portion 18 are all formed integrally from a single piece of round steel bar. The single piece of round steel bar is simply bent at the appropriate locations to effect the final shape of the transducer mounting device 10.

Figure 5:
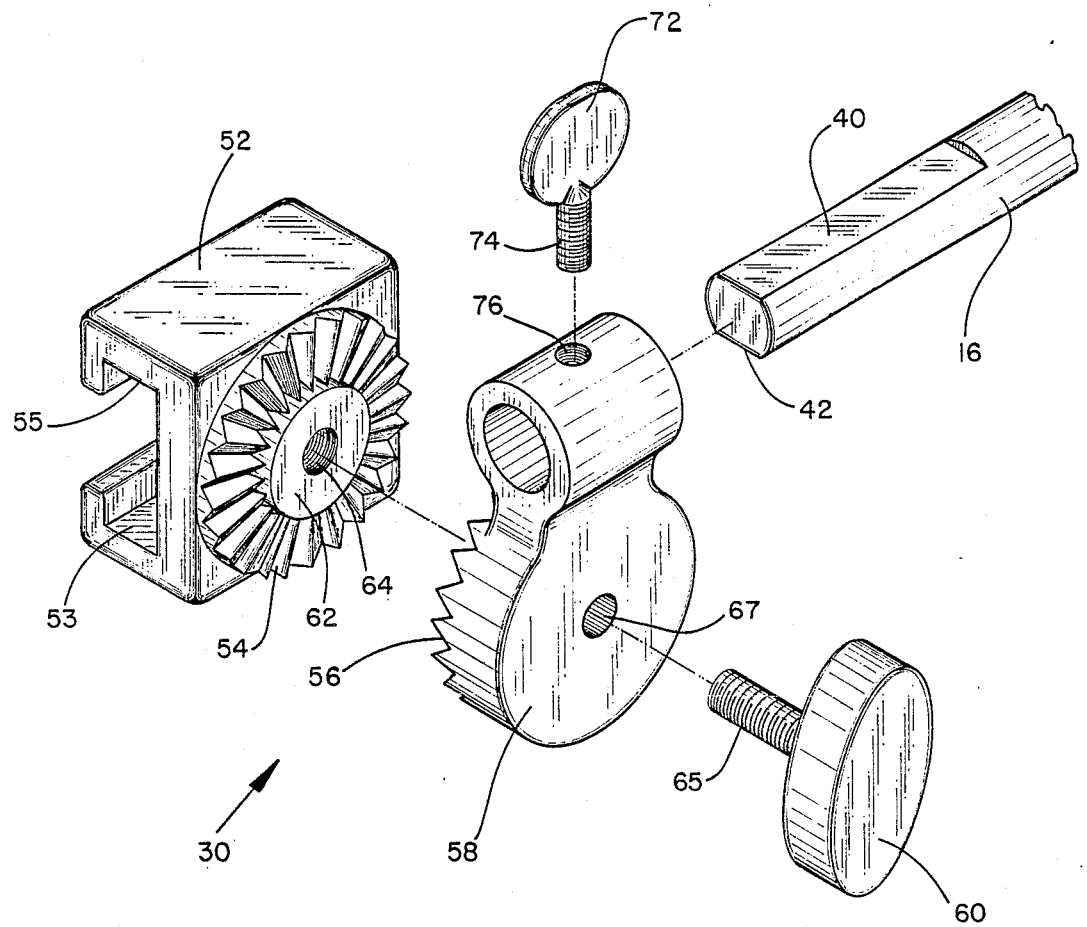
FIG. 5 is an exploded view of the bracket that holds and positions the bar with respect to the operating table.

The extension finger 16 is provided with a flattened or beveled surface 40 that cooperates with the bracket 30 to rotatably secure the transducer mounting device 10 to the operating table 20. As shown in FIG. 5, the bracket 30 comprises a C-shaped clamp 52 that slides onto the frame 26 of the operating table 20. The outer surface 62 of the C-shaped clamp 52 has a plurality of circumferentially-disposed teeth 54 that mesh with cooperating circumferentially-disposed teeth 56 on the inner surface of holder 58. A fastening pin 60 fits through a central aperture 67 in the holder 58. The threaded end 65 of the fastening pin 60 screws into a cooperating threaded recess 64 in the center of the outer surface 62 of the C-shaped clamp 52. In use, when the fastening pin 60 is loosened by being partially unthreaded from threaded recess 64, holder 58 can be manually rotated about the axis of fastening pin 60 with respect to clamp 52 to thereby adjust the orientation of the transducer mounting device 10 with respect to the operating table 20. When the appropriate orientation is achieved, fastening pin 60 is tightened into threaded recess 64. This causes the teeth 54 to mesh with the teeth 56 to securely fasten the holder 58 in place against the clamp 52.

Integrally formed on the surface of holder 58 is a mounting loop 70. The internal diameter of the mounting loop 70 is slightly larger than the diameter of the extension finger 16 which allows the extension finger 16 to easily slide within the mounting loop 70. A set screw 72 having a threaded member 74 is mounted in a threaded aperture 76 in the wall of loop 70. When the appropriate lateral positioning of the extension finger 16 has been achieved, the set screw 72 is tightened against the beveled surface 40 of the extension finger 16 to hold the extension finger 16 firmly in place.

During use of the transducer mounting device 10, a vast array of peripheral equipment such as bags, tubes and power supplies are hung from and wind around the horizontal arm portion 12 and the vertical arm portion 18. In order to allow the vertical rotation of the horizontal arm portion 12 about the axis of bracket 30, it is necessary to offset the axis of the horizontal arm portion 12 from the axis of the extension finger 16. This offset is achieved by using offset member 14. Therefore, when vertical rotation of the horizontal arm portion 12 is effected, the operating table 20 will not interfere with any peripheral equipment attached to either the horizontal arm portion 12 or the vertical arm portion 18.

Once the patient is placed on the operating table and the transducers are attached to the patient at the selected monitoring positions, the transducer support 28 is positioned on the vertical arm portion 18 and the transducer mounting device 10 is oriented in relation to the operating table so that the transducers are at the level of the patient's heart. At all times during the operation, the transducers will then always remain at the level of the patient's heart regardless of how the operating table is raised, lowered, titled or rotated.

Various modifications can be made to the invention without departing from its spirit. For example, the height of the vertical arm portion 18 can be varied depending on the size of the transducer support 28 to be used as well as the amount and extent of the peripheral equipment associated with the transducer support and each transducer. Similarly, the length of the horizontal arm portion 12 can also be varied to accommodate operating tables of different sizes. Smaller or larger diameter round steel bars may be used depending on the strength and load requirements necessitated by the transducer and its associated peripheral equipment. The transducer mounting device 10 can be fabricated from materials other than steel, such as plastic, synthetic composites or graphite rods.

We claim:

1. A transducer mounting device comprising a bar including:
   (a) a horizontal arm portion,
   (b) a vertical arm portion integrally joined to a first end of the horizontal arm portion,
   (c) a horizontal offset member integrally joined to a second end of the horizontal arm portion,
   (d) a horizontal extension finger integrally joined to the offset member and generally coplanar therewith, and
   (e) bracket means for rotatably securing the extension finger to the frame of an operating table.

2. The transducer mounting device of claim 1 including means for reinforcing the junction of the horizontal arm portion to the vertical arm portion.

3. The transducer mounting device of claim 2 wherein the means for reinforcing includes a triangular reinforcing member.

4. The transducer mounting device of claim 3 wherein the triangular reinforcing member is a flat steel plate.

5. The transducer mounting device of claim 3 including means for hanging transducer peripheral equipment from the triangular reinforcing member.

6. The transducing mounting device of claim 5 wherein the means for hanging is a hook means.

7. The transducer mounting device of claim 1 wherein the extension finger has a beveled surface for securely holding the extension finger to the bracket means.

8. The transducer mounting device of claim 1 wherein the bracket means includes a clamp means for connecting the bracket means to the frame of an operating table, a holder means for holding the extension finger and a fastening pin means for joining the holder means to the clamp means.

9. The transducer mounting device of claim 8 wherein the clamp means is a C-shaped clamp.

10. The transducer mounting device of claim 8 wherein the clamp means has circumferentially-disposed teeth on its outer surface and the holder means has circumferentially-disposed teeth on its outer surface in cooperating spaced relation to secure the holder means to the clamp means when the fastening pin means is tightened.

11. The transducer mounting device of claim 8 wherein the holder means includes means for mounting the extension finger to the holder.

12. The transducer mounting device of claim 11 wherein the means for mounting is a loop integrally joined to the holder means, said loop having an inside diameter slightly larger than the diameter of the extension finger so that the extension finger can easily slide into the loop.

13. The transducer mounting device of claim 12 wherein the extension finger has a beveled edge on its surface and the loop is provided with a set screw that cooperates with the beveled edge to secure the extension finger in place.

14. A transducer mounting device comprising a bar including:
(a) a horizontal arm portion,
(b) a vertical arm position integrally joined to a first end of the horizontal arm portion,
(c) a horizontal offset member integrally joined to the second end of the horizontal arm portion,
(d) a horizontal extension finger integrally joined to the offset member and generally coplanar therewith,
(e) bracket means for rotatably securing the extension finger to the frame of an operating table, and
(f) means for hanging transducer peripheral equipment from the bar.

15. The transducing mounting device of claim 14 wherein the means for hanging is a hook means.

* * * * *